3,043,708
MODIFIED CARBON BLACK

John William Watson, Sutton Coldfield, Charles Edwin Kendall, Birmingham, and Roy Jervis, Newcastle, England, assignors to Dunlop Rubber Company Limited, London County, England, a company of Great Britain
No Drawing. Filed July 13, 1959, Ser. No. 826,447
Claims priority, application Great Britain July 22, 1958
17 Claims. (Cl. 106—307)

This invention relates to modified carbon blacks and to a method of preparing them.

Commercial carbon blacks have a large specific surface area and consist essentially of elemental carbon in the form of small particles. Different types of carbon black may be classified according to particle size and method of production. This invention is based on the discovery that carbon black contains chemically reactive sites on the surface of the particles which are able to react with chemical reagents.

It is an object of this invention to modify carbon black by attaching organic groups to the surface of the particles thereof.

Accordingly the present invention comprises carbon black having hydrocarbon groups chemically attached to the surface of the particles thereof.

According to the invention also a process for the production of modified carbon black comprises reacting carbon black with an alkylating agent in the presence of a Friedel-Crafts type reaction catalyst.

Hydrocarbon groups which can be attached to the surface of the carbon black particles include aliphatic and aromatic groups, such as alkyl, alkenyl, aralkyl and aryl groups; for example methyl, ethyl, propyl, isopropyl, allyl, butyl, phenyl, benzyl and ethyl-phenyl groups. Carbon blacks containing such groups will be referred to as modified carbon blacks and, according to the hydrocarbon groups on the surface, they will also be referred to as alkylated or arylated carbon blacks. For the purpose of this specification the term "alkylated carbon black" includes blacks having alkyl, alkenyl or aralkyl groups chemically attached to the surface of the particles.

The hydrocarbon groups can be chemically attached to the surface of the particles of a wide variety of carbon blacks. These include the furnace blacks, thermal blacks and channel blacks. Examples of furnace blacks are super abrasion furnace blacks, high abrasion furnace blacks, fast extrusion furnace blacks and fine furnace blacks. Examples of channel blacks are medium processing channel blacks, hard processing channel blacks and conducting channel blacks. Carbon black produced from acetylene and the various graphitized blacks may also be used.

The number of hydrocarbon radicals on the surface of the particles of modified carbon black will depend on the number of chemically reactive sites which are present on the surface of the particles. If a hydrocarbon group is chemically attached to each reactive site on the surface then the carbon black will be fully alkylated or arylated. If, however, all the reactive sites on the surface of the particles are not occupied by hydrocarbon groups then the carbon black will be only partially alkylated or arylated. A fully or partially alkylated or arylated carbon black contains a higher proportion by weight of hydrogen than when no alkyl or aryl groups are chemically attached to the surface of the particles. However, the particle size of the black containing alkyl or aryl groups show no appreciable difference from that of the black when no groups are attached to the surface. Fully and partially alkylated or arylated carbon blacks are hydrophobic and may be used to reinforce rubber compositions.

One method of preparing modified carbon black in accordance with the invention consists in reacting carbon black with an alkylating agent in the presence of a Friedel-Crafts type reaction catalyst. It is usually beneficial to dissolve the alkylating agent in a solvent therefor, preferably a volatile solvent.

The alkylating agents which may be used to prepare the modified carbon black include the organic compounds known as Friedel-Crafts alkylating agents. These organic compounds include olefines, highly strained cycloparaffins, poly alkyl benzenes, alkyl halides, alcohols, ethers and esters of organic and inorganic acids. Examples of these compounds are olefines such as ethylene, propylene, butylene, 3-methyl-1-butene, cyclopentene and cyclohexene; highly strained cycloparaffins such as cyclopropane; polyalkyl benzenes such as polyethyl benzenes and polyisopropyl benzenes, alkyl halides huch as methyl iodide, ethyl chloride, 1,3-dibromo propane, isopropylidene chloride, propyl bromide and butyl chloride; alcohols such as methanol, ethanol, n-propyl alcohol, isopropyl alcohol, butyl alcohols, cyclobutyl carbinol and alpha-phenyl propanol; ethers such as diethyl ether, isopropyl ether and n-amyl ether; esters of organic acids such as methyl chloroformate, ethyl acetate, ethyl chloroacetate, butyl stearate and esters of inorganic acids such as dimethyl sulphate, diethyl sulphate, n-butyl sulphite and n-butyl phosphate.

The reaction catalysts which may be used to prepare the carbon blacks include the known Friedel-Crafts catalysts such as metal halides, for example, aluminum chloride, antimony pentachloride, ferric chloride, tellurium dichloride, and bismuth trichloride, and other compounds such as boron trifluoride, hydrogen fluoride, sulphuric acid, phosphoric acid and phosphorus pentoxide.

The alkylating agent may be dissolved in a volatile organic solvent which is chemically inert to the carbon black, also to the alkylating agent and the reaction catalyst. Typical solvents are the aliphatic hydrocarbons such as hexane or heptane and aromatic compounds such as nitro-benzene.

In carrying out the preparation of the modified carbon black, commercial carbon black is admixed with alkylating agent and solvent, if used. When a reactive catalyst such as aluminium chloride is used then the mixture is preferably cooled to about 0° C. before the addition of the catalyst and after addition of catalyst the temperature of the mixture is allowed to rise to about room temperature. When less reactive catalysts are used these may be added to mixtures which are at or about room temperature. The reaction between the alkylating agent and commercial carbon black will take place at room temperature but to accelerate the reaction it is often preferable to heat the mixture until the solvent or alkylating agent refluxes gently at or about the boiling point of the mixture. When the reaction is completed the mixture is cooled and a carbon black with alkyl, alkenyl or aralyyl groups on the surface of the particles thereof is obtained.

The degree of alkylation of carbon black, i.e. the number of alkyl, alkenyl or aralkyl groups on the surface, depends on the amount of alkylating agent and catalyst used. If a small quantity of alkylating agent is used then the surface will only be partially alkylated. Alternatively if the reaction is carried out for short periods or at a lower temperature than that required for full alkylation a similar carbon black will be obtained.

A modified carbon black containing aryl groups attached to the surface of the particles may be obtained by reacting a halogenated black with an aromatic hydrocarbon, such as benzene or naphthalene in the presence of a Friedel-Crafts type catalyst. The halogenated black may be prepared by reacting commercial carbon black with a halogen such as chlorine or bromine.

Carbon blacks according to the present invention may be used as reinforcing fillers for natural and synthetic rubber. The compositions so obtained can be used for the fabrication of tyres, belts and other rubber articles and it has been found that such compositions have improved physical properties over those containing unmodified carbon black. For example, the abrasion resistance, tear resistance and tensile strength may increase by up to 83 percent, 75 percent and 112 percent respectively. The use of the modified carbon black for the reinforcement of rubber is described and claimed in our co-pending application Serial No. 826,401, filed July 13, 1959.

The presence of hydrocarbon groups chemically attached to the surface of the particles of modified carbon black renders the carbon black more reactive towards free-radical curing agents having the general formula

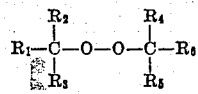

in which $R_1$ and $R_6$ represent aryl groups, $R_2$, $R_3$, $R_4$ and $R_5$ represent hydrogen or alkyl groups containing less than 4 carbon atoms, which remove hydrogen from natural or synthetic rubber than commercial carbon blacks. An example of such a free-radical curing agent is dicumyl peroxide.

The following examples illustrate the invention.

Example I

This example illustrates the preparation of a fully methylated carbon black.

Five hundred grammes of a high abrasion furnace black with a specific surface area of about 80 square metres per gramme, available under the trade name Philblack O and 220 grammes of methyl iodide were mixed with 2 litres of n-hexane. The mixture was cooled to 0° C. and 200 grammes of aluminium chloride were slowly added whilst the mixture was agitated. After allowing the mixture to attain room temperature it was heated under reflux for 22 hours whilst stirred. The mixture was allowed to cool to room temperature and a mixture of 2000 grammes of ice and 100 ml. of concentrated hydrochloric acid was then added. The excess liquid was decanted from the carbon black which was then steam distilled to remove from the carbon black any residual methyl iodide and n-hexane.

The modified carbon black was filtered from the aqueous solution and washed with a small amount of methyl alcohol followed by water until free from salts and acid. The modified carbon black was then dried in an oven at a temperature of 120° C.

Samples of the modified and unmodified carbon black were analysed for their carbon and hydrogen contents. These are listed below.

|  | Percentage composition by weight ||
|---|---|---|
|  | Carbon | Hydrogen |
| Unmodified sample | 97.70 | 0.20 |
| Modified sample | 97.14 | 0.35 |

Example II

This example illustrates the preparation of a fully ethylated carbon black.

Five hundred grammes of the unmodified carbon black described in Example I were reacted with 150 grammes of ethyl bromide and 200 grammes of aluminium chloride dispersed in 2 litres of n-hexane in a similar manner to that described in Example I.

The modified carbon black sample so obtained and a sample of the unmodified carbon black were analysed. The carbon and hydrogen contents are given below.

|  | Percentage composition by weight ||
|---|---|---|
|  | Carbon | Hydrogen |
| Unmodified sample | 97.6 | 0.31 |
| Modified sample | 96.72 | 0.94 |

The modified carbon black was extremely hydrophobic.

Example III

This example illustrates the preparation of a fully butylated carbon black.

Five hundred grammes of the unmodified carbon black described in Example I were reacted with 150 grammes of n-butyl chloride and 200 grammes of aluminium chloride dispersed in 2 litres of n-hexane in a similar manner to that described in Example I.

The modified carbon black sample so obtained and a sample of unmodified carbon black were analysed. The carbon and hydrogen contents are given below.

|  | Percentage composition by weight ||
|---|---|---|
|  | Carbon | Hydrogen |
| Unmodified sample | 97.54 | 0.23 |
| Modified sample | 96.05 | 0.93 |

The modified carbon black obtained in this example was extremely hydrophobic.

Example IV

This example illustrates a carbon black containing dimethylene groups chemically attached to the surface of the particles.

Five hundred grammes of the unmodified carbon black described in Example I were reacted with 150 grammes of 1:2-dichloroethane and 200 grammes of aluminium chloride in a similar manner to that described in Example I.

The modified carbon black sample so obtained and a sample of the unmodified carbon black were analysed. The carbon, hydrogen and chlorine contents are given below.

|  | Percentage composition by weight |||
|---|---|---|---|
|  | Carbon | Hydrogen | Chlorine |
| Unmodified sample | 97.54 | 0.23 | 0 |
| Modified sample | 97.07 | 0.60 | 0.08 |

From this data it was calculated that 165 atoms of hydrogen had entered the carbon black for every chlorine atom introduced. Evidently the alkyl groups existed mainly as dimethylene groups rather than chloroethyl groups.

Example V

This example illustrates that a reduction in the amount of catalyst will reduce the degree of alkylation of the carbon black.

A similar experiment to that described in Example I was carried out using 500 grammes of the unmodified carbon black described in Example I, 150 grammes of ethyl bromide and 50 grammes of aluminium chloride.

The modified black sample so obtained and a sample of the unmodified carbon black were analysed. The carbon and hydrogen contents are given below.

|  | Percentage composition by weight ||
|  | Carbon | Hydrogen |
| --- | --- | --- |
| Unmodified sample | 97.54 | 0.23 |
| Modified sample | 96.42 | 0.46 |

The modified carbon black contains 0.23 percent by weight of hydrogen in excess of the unmodified black and the fully ethylated carbon black described in Example II contains 0.63 percent by weight of hydrogen in excess of the unmodified black described in that example. Thus, the modified black prepared as described in this example was alkylated to about 37 percent of the maximum.

Another sample of an ethylated carbon black was prepared by repeating the above experiment but using 12.5 grammes of aluminium chloride instead of 50 grammes. The modified black sample so obtained and a sample of the unmodified carbon black were analysed. The carbon and hydrogen contents are given below.

|  | Percentage composition by weight ||
|  | Carbon | Hydrogen |
| --- | --- | --- |
| Unmodified sample | 97.54 | 0.23 |
| Modified sample | 97.23 | 0.34 |

The modified carbon black contained 0.11 percent by weight of hydrogen in excess of the unmodified black while the fully ethylated black described in Example II contained 0.63 percent by weight of hydrogen in excess of the unmodified black described in that example. Thus, the modified black prepared as described in this example was alkylated to about 17 percent of the maximum.

The modified carbon blacks obtained in this example were more easily wetted with water than the samples described in the Examples I to IV.

Example VI

This example illustrates the preparation of a modified carbon black containing unsaturated hydrocarbon groups on the surface.

Six grammes of the unmodified carbon black described in Example I were mixed with 60 grammes of allyl alcohol. A slow continuous stream of boron trifluoride was passed at room temperature through the mixture and after 30 minutes the mixture had become extremely viscous and the temperature had risen to about 80° C. At this stage the flow of boron trifluoride was stopped and the reaction mixture was found to have increased in weight by about 6 grammes. After cooling, the carbon black was washed with diethyl ether in order to remove the reaction byproducts. Finally a little methyl alcohol was mixed with the black followed by repeated washing with water. The modified black so obtained was dried in an oven at 120° C. for 16 hours and then vacuum dried at room temperature. The modified carbon black was found to be very hydrophobic and to have an increased hydrogen content which shows that the black had been alkylated.

The unmodified carbon black contains 0.32 percent by weight of hydrogen while the modified carbon black contains 0.82 percent by weight of hydrogen.

Having now described our invention, what we claim is:

1. A modified carbon black for effecting improvement in natural and synthetic rubbers and the like, and having at least a portion of the reactive sites on the surface of carbon black particles chemically attached through carbon-to-carbon bonds with hydrocarbon groups forming additions to the carbon black and providing increased hydrogen content thereof.

2. A modified carbon black according to claim 1 in which the hydrocarbon groups are aliphatic groups.

3. A modified carbon black according to claim 1 in which the aliphatic groups are alkyl groups.

4. A modified carbon black according to claim 1 in which the hydrocarbon groups are aryl groups.

5. A modified carbon black according to claim 1 in which the black is fully alkylated.

6. A modified carbon black according to claim 1 in which the black is partially alkylated.

7. A process for the production of modified carbon black which comprises mixing carbon black with a Friedel-Crafts alkylating agent in the presence of a Friedel-Crafts reaction catalyst.

8. A process according to claim 7 in which the Friedel-Crafts alkylating agent is dissolved in a solvent therefor, which is chemically inert to said carbon black, Friedel-Crafts alkylating agent and Friedel-Crafts reaction catalyst.

9. A process according to claim 7 in which the Friedel-Crafts alkylating agent is an alkyl halide.

10. A process according to claim 7, in which the Friedel-Crafts reaction catalyst is a metal halide.

11. A process according to claim 10 in which the metal halide is aluminium chloride.

12. A process according to claim 7, in which the Friedel-Crafts reaction catalyst is boron trifluoride.

13. A process according to claim 11 in which carbon black is mixed with the Friedel-Crafts hydrocarbon group forming said alkylating agent and the mixture is cooled to about 0° C. prior to the addition of said aluminium chloride.

14. A process according to claim 8 in which the mixture of carbon black, alkylating agent, solvent therefor and Friedels-Crafts reaction catalyst is heated to a temperature about the boiling point of the mixture.

15. A process for the production of modified carbon black with aryl groups chemically attached to the surface which comprises mixing a halogenated carbon black with an aromatic hydrocarbon in the presence of a Friedels-Crafts reaction catalyst.

16. A modified carbon black according to claim 1 in which the black is fully arylated.

17. A modified carbon black according to claim 1 in which the black is partially arylated.

References Cited in the file of this patent

UNITED STATES PATENTS

| 2,408,696 | Smallwood | Oct. 1, 1946 |
| 2,780,612 | Te Grotenhuis | Feb. 5, 1957 |
| 2,816,046 | Damusis | Dec. 10, 1957 |
| 2,867,540 | Harris | Jan. 6, 1959 |
| 2,893,887 | Voet | July 7, 1959 |

FOREIGN PATENTS

| 515,286 | Belguim | Aug. 6, 1954 |